United States Patent
Rupert et al.

[15] 3,665,063
[45] May 23, 1972

[54] METHOD FOR BLOW MOLDING HOLLOW ARTICLES IN MINIMUM CYCLE TIME

[72] Inventors: Samuel J. Rupert; William E. Ziegler, both of Ann Arbor, Mich.

[73] Assignee: Hoover Ball and Bearing Company, Saline, Mich.

[22] Filed: Apr. 15, 1970

[21] Appl. No.: 28,211

Related U.S. Application Data

[63] Continuation of Ser. No. 722,978, Apr. 22, 1968, abandoned.

[52] U.S. Cl. .............................. 264/89, 18/5 BH, 18/5 BZ, 264/98
[51] Int. Cl. ................................................ B29c 17/07
[58] Field of Search ............... 264/94, 96, 97, 98, 99, 89; 18/5 BE, 5 BB, 5 BZ, 5 BH

[56] References Cited

UNITED STATES PATENTS

| | | | |
|---|---|---|---|
| 3,311,684 | 3/1967 | Heider | 264/99 |
| 3,399,424 | 9/1968 | Sheptak | 18/5 BZ |
| 3,479,420 | 11/1969 | Wilson et al. | 264/96 X |

FOREIGN PATENTS OR APPLICATIONS

| | | | |
|---|---|---|---|
| 375,737 | 6/1962 | Japan | 264/94 |
| 630,581 | 7/1963 | Belgium | 264/94 |
| 1,085,662 | 9/1963 | Germany | 264/96 |

*Primary Examiner*—Robert F. White
*Assistant Examiner*—J. H. Silbaugh

[57] ABSTRACT

A method of making a hollow plastic article characterized by a low cycle time. A mold is cooled to a selected temperature below ambient, a tube of plastic material open at its leading end is extruded to a length greater than the length of the article to be formed, and the tubing is enclosed in the mold at a mold closing rate such that condensation has not formed in the mold. During the closing of the mold, the leading end of the tubing is closed and sealed to entrap air at atmospheric pressure and a sufficient portion of the leading end of the sealed tube is collapsed by the closing mold to reduce the internal volume of the tubing and partially expand the tubing due to the resulting increase of internal pressure. Air is then injected into the partially expanded tubing to inflate the tubing to final form in the closed mold and the mold is then opened and the finished article rejected in the minimum cycle time comensurate with the selected temperature to which the mold is cooled.

3 Claims, 10 Drawing Figures

INVENTORS
SAMUEL J. RUPERT
WILLIAM E. ZIEGLER
BY
*Olsen and Stephenson*
ATTORNEYS INVENTORS
SAMUEL J. RUPERT
WILLIAM E. ZIEGLER
BY
*Olsen and Stephenson*
ATTORNEYS

METHOD FOR BLOW MOLDING HOLLOW ARTICLES IN MINIMUM CYCLE TIME

This application is a continuation of application Ser. No. 722,978, filed Apr. 22, 1968, and now abandoned.

BACKGROUND OF THE INVENTION

The present invention relates to blow molding of hollow articles from organic plastic materials, and particularly is directed to a method of forming hollow articles in minimum cycle time.

It is well known in the art of blow molding to form a parison which can be sealed and partially inflated prior to being enclosed in a mold. Generally, the purpose of such prior art devices is to change the shape of the parison from a straight extruded tube to one which conforms more nearly to the configuration of the product which is to be formed. In some instances these prior art practices are followed in order to permit extruding the parison through a relatively small orifice, which is an extrusion operation easier to perform than when larger diameter orifices are employed, and it is also done to permit the combined injection molding of the neck finish with a subsequent blow molding process.

The prior art procedures described above have a serious drawback in that they increase the cycle time, thereby reducing the overall efficiency of the blow molding apparatus. One of the principal objects in blow molding is to produce containers having the lowest unit cost, and this demands that the cycle time be as short as is possible. When the shaping of the parison occurs during mold-open time, the normal result is that an increase in mold-open time is required, and this in turn also has the harmful effect of increasing the mold-close time. This follows because the mold-close time is indirectly influenced by the length of time that the mold is open. The mold-close time is determined by the rate of heat transfer of the plastic material to the walls of the mold, and the colder the mold, the faster the transfer of heat, and therefore, the shorter the mold-close time. For this reason, it is conventional practice to pass coolants through the molds to reduce the temperature of the molds below the ambient temperature. The extent to which the molds can be cooled is limited by the ambient humidity conditions and the time that the molds are left open. The longer that the molds are left open, the more nearly the mold temperature must approach the ambient temperature, and conversely, the shorter the mold-open time, the greater can be the temperature differential between the molds and the ambient atmosphere. This condition prevails because if the molds are reduced to an excessively low temperature or are left open for an excessive time period, condensation will form in the mold faces which, after the molds are closed and the articles are blown will impair the surfaces of the articles to destroy or lower their usefulness.

Thus it follows that the shorter the mold-open time, the lower is the temperature of the molds that can be used, and this in turn will have the effect of shortening the mold-close time, and therefore, the overall cycle time of the blow molding operation will be kept at a minimum. Therefore, in order to operate in the most efficient manner, it is desirable to form an acceptable and useable parison by selecting and designing the proper extrusion head tooling rather than to rely on changing the shape of the extruded parison after its extrusion but before the molds have been closed. However, this more desirable procedure may also create additional problems. For example, when making a large lightweight container having a hollow handle, the parison must have a relatively large diameter, and accordingly is very thin when extruded, and therefore, it does not have a great amount of resistance to change in its shape. When a mold is closed on such a large, thin-walled parison, there is a tendency for the sides of the parison to come together thus creating a web in the final container. These webs normally occur in the handle portion of the container, and when this occurs, the usefulness of the container may be impaired, because the filling operation will be affected so that in many instances a container having webbing in the handle may be unuseable. This is particularly true in the dairy industry where milk containers must be completely filled and cannot have voids in the handles, for example.

SUMMARY OF THE INVENTION

The present invention has overcome the shortcomings of the prior art and provides an improved method for blow molding articles from plastic material, wherein extrusion orifices of desired size or shape are used which have been selected to provide the most efficient cycle time for the blow molding operation. By virtue of the present invention this selection can be made without impairment of the quality of the finished product. This has been accomplished by selecting a die head having an extrusion orifice of the dimension necessary for blow molding in the most efficient manner, and mold means are provided which function when closing the mold on the extruded parison to initially close the open end of the extruded parison, and thereafter to pinch closed an additional portion of the parison outside the mold cavity so as to partially inflate the parison confined within the cavity to assure that the enclosed parison is free of any undesirable webbing which might be formed if a partial collapse of the tube were to occur when the mold sections moved into closed positions. Thereafter the parison is blown to its final form within the mold.

In accordance with a preferred form of the present invention, a method of blow molding is provided which utilizes apparatus comprising a combination of extrusion means for extruding a tube through an annular orifice, mold means for enclosing the extruded tube in an article forming cavity to form said blank, and means for injecting a gaseous medium into the blank to expand it to the shape of the cavity. The mold means comprises a pair of separable mold sections defining the cavity, and each of the sections has an extensible pinch bar seated in its parting face at a location spaced from the cavity portion. Each pinch bar is in abutting relation to the pinch bar of the other section when such sections are closed. Means are provided for urging the pinch bars to extended positions outward of the parting faces when the mold sections are open and operable when the mold sections are moved toward closed positions to allow the pinch bars to come into abutting engagement and thereafter to return to seated positions as an incident of the closing of the mold sections. In such an operation, the molds can be cooled to the maximum extent permitted below ambient temperatures, and the mold-open time is kept at a minimum, being restricted only to the length of time that it is required to extrude the parison.

Thus, the present invention includes the method of making a plastic article by blow molding a blank in an enclosed mold comprising the steps of cooling the mold to a selected temperature below ambient temperature, extruding a tube of plastic material open at its leading end, and closing the tube in the mold at a rate of time such that significant condensation has not yet formed in the mold, and as an incident to enclosing the tube in said mold the open end of the tube is closed to form a blank with air trapped therein substantially at atmospheric pressure and a portion of the closed blank is then collapsed to reduce the volume of the blank so as to increase the internal air pressure to expand the blank partially as the mold is closed. Thereafter, air is injected into the partially expanded blank to inflate the blank to final form.

Thus, it is the primary object of the present invention to provide improved method for producing plastic articles.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figures 1, 2:
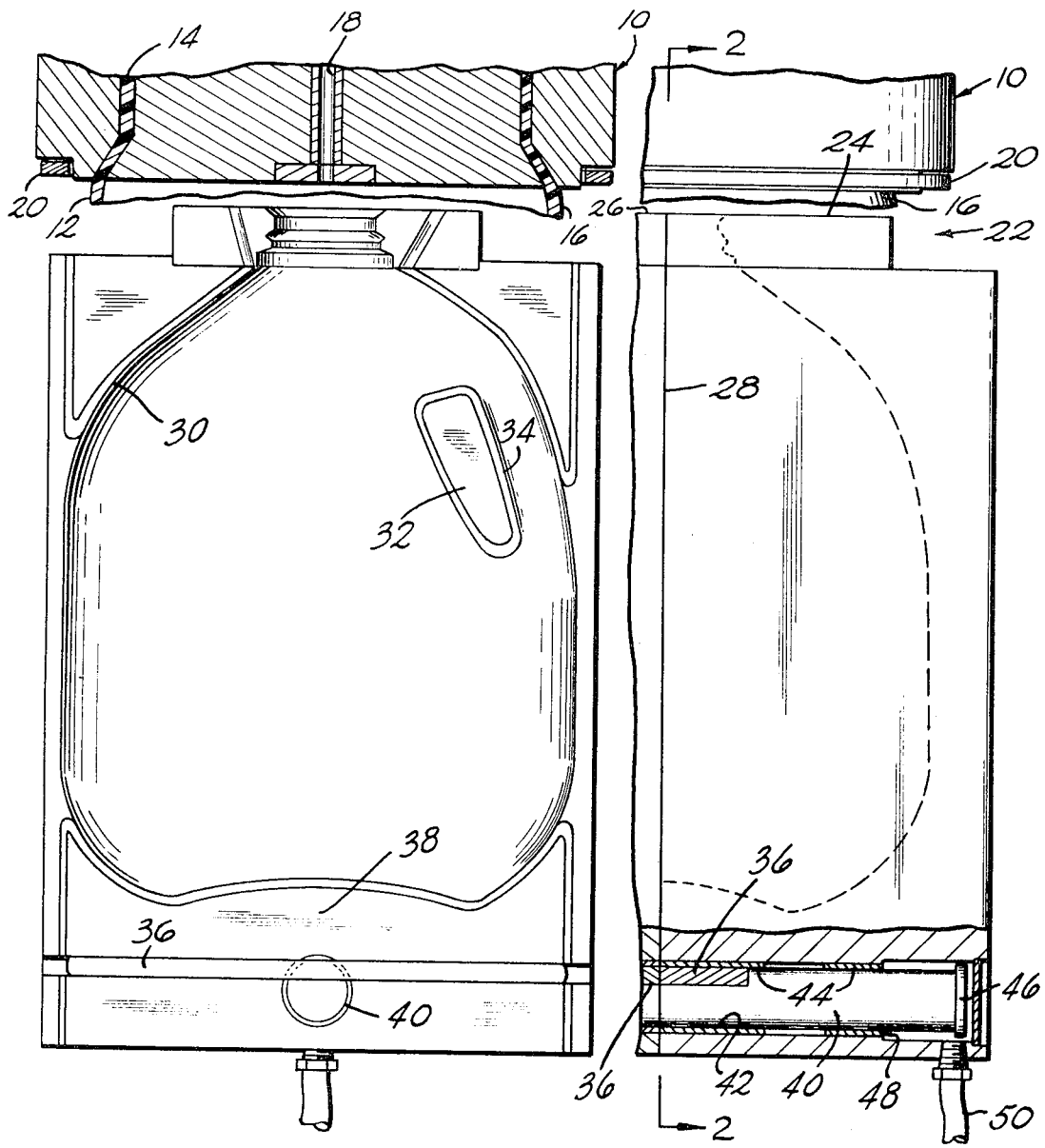
FIG. 1 is a fragmentary view, partly in section, showing the cavity of one mold section and the associated extrusion head of the blow molding machine.
FIG. 2 is a fragmentary side elevational view showing the mold sections in closed positions and showing in section the means for pinching the extruded tube together prior to complete closing of the mold sections.

Referring now to the drawings, the invention will be described in greater detail. Initially the apparatus illustrated in FIGS. 1 and 2 will be described, and attention is directed to these two figures. A conventional extrusion die head 10 is provided with an outlet orifice 12 through which the plastic material 14 can be extruded in the form of an open-ended tube 16. Air can be introduced into the extruded tube 16 through the conventional blow pin 18. A conventional stripper member 20 is provided for stripping the blown container from the die head 10 after the article has been blown. For more details of this conventional apparatus, reference is made to prior U.S. Pat. No. 3,120,679, granted Feb. 11, 1964 to C. A. Price et al.

Positioned adjacent to the extrusion die head 10 is the mold 22 which includes the mold sections 24 and 26 which are separable on their common parting faces or surfaces 28. The mold sections form the cavity 30 in which can be blow molded a jug having a hollow handle. For this purpose, the mold sections are provided with lands 32 which engage opposite surfaces of the extruded tube 16 during closing of the mold sections, thereby forming a blank which has a main body portion and a tubular portion in the handle portion 34 of the mold sections. As is described in further detail in U.S. Pat. No. 3,120,679, during the subsequent blowing step, the jug will be formed having the hollow handle defined by the handle portion 34.

When blow molding containers in the form of jugs having a capacity of one gallon or more, it is normally necessary to extrude a tube 16 having a relatively large diameter, substantially equal to the maximum transverse dimension of the container, if such jug is to have a blown hollow handle. The wall thickness of the extruded tube will then be relatively small, and it is found that under these circumstances the portion of the extruded tube which is confined in the closed mold 22 in the handle portion 34 will have relatively little resistance to collapse, and if any collapse should occur, webbing will be created across the hollow handle when the subsequent blowing operation takes place.

In order to avoid this problem, the lower portions of the mold sections 24 and 26 incorporate improvements which will permit partial inflation of the parison at the time the mold sections are closed, thereby preventing the creation of webbing in the handle. For this purpose, each of the mold sections has an extensible pinch bar 36 which is seated in the parting face or surface at a location spaced below the bottom edge of the cavity 30 so that a relatively flat land 38 is provided between the pinch bar and the cavity 30. Each pinch bar 36 is mounted on a piston 40 which is adapted to reciprocate in a cylindrical housing 42. Suitable bushings 44 may be provided to facilitate easy movement of the piston 40 therein. The inner end of the piston 40 has an enlarged head 46 to limit the forward movement of the piston when it comes into engagement with the shoulder 48. The piston 40 can be moved so that the pinch bar 36 is in an extended position when air under pressure is introduced through the conduit 50 into the inner end of the cylindrical housing 42.

The pinch bars 36 are arranged so that they will be in abutting positions when the mold sections are closed. When the mold sections are moved toward a closed position, the pinch bars 36 will engage one another and further movement of the mold sections to the closed position will result in the pistons 40 being moved to a retracted position against the low air pressure to the positions shown in FIG. 1. It is to be understood that when the pinch bars 36 are in the fully extended positions, and the mold sections 24 and 26 are in their open positions, a space will exist between the pinch bars 36 for passage of the extruded tube 16. When the mold sections are moved toward their closed positions, air will be introduced into the cylindrical housing 42 into the conduits 50 to extend the pinch bars, and initially the pinch bars will engage the lower portion of the extruded tube to close the open end, and then as the mold sections continue to move toward their closed positions, the lower portion of the closed blank will be engaged by the faces 38 of the mold sections, thereby closing an additional portion of the lower end of the extruded tube, and the air which was in the closed portion will be forced into the remaining open portion of the blank parison. This will have the effect of partially expanding the blank or parison. Thus, as the molds close the portion of the parison which is in the handle portion 34 of the mold sections will be partially inflated, thereby preventing partial collapse of this portion of the parison. Thereafter, the parison can be fully inflated by introduction of air through the air mandrel 18, and a container will be blown to final form which is free of any imperfections, such as undesirable webbing that might otherwise be present in the hollow handle of the jug.

Figure 3:
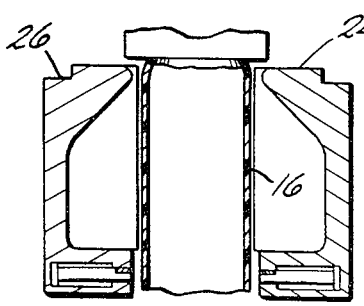
FIGS. 3, 4, 5 and 6 are fragmentary sectional views taken through the two mold sections showing in sequence the extrusion of the tube in the open mold sections, the closing of the tube prior to complete closing of the mold sections, pinching closed a portion of the closed blank to partially inflate the blank remaining within the mold cavity, and blowing of the blank to its final form.
Figure 4:
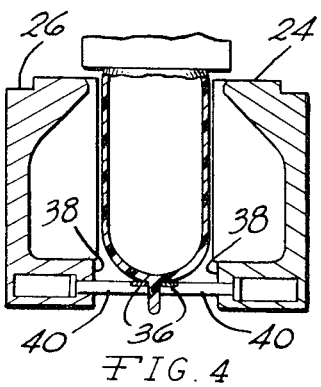
Figure 5:
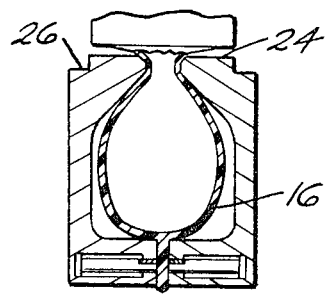
Figure 6:
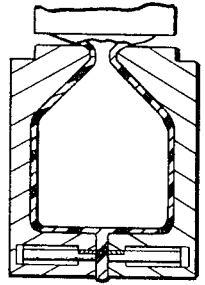
Figure 7:
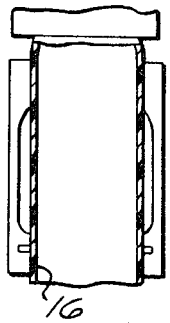
FIGS. 7, 8, 9 and 10 show similar steps of operation when viewed on a plane passing through the center line of the extrusion head parallel to the parting surfaces of the mold sections.
Figure 9:
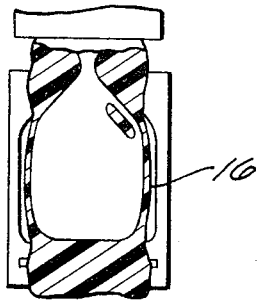
Figure 8:
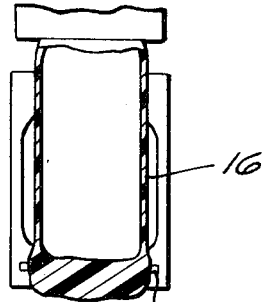
Figure 10:
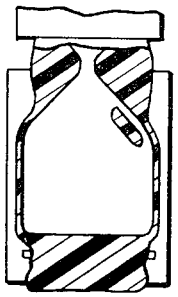

Referring now to FIGS. 3–10, a brief description will be provided of the sequence of steps that occur in this operation. As shown in FIGS. 3 and 7, a hollow open-ended tube 16 has been extruded between the open-mold sections 24 and 26. The mold sections are next moved toward closed positions and in timed relation with this movement, the pistons 40 are moved to extended positions of the pinch bars 46, which acts to close the lower end of the extruded tube. This step is shown in FIGS. 4 and 8. As the mold sections 24 and 26 continue movement to a closed position, a further portion of the parison is pinched between the faces 38 to reduce the total volume of the extruded parison or blank, thereby causing the blank to partially expand as can be seen best in FIGS. 5 and 9. This further closing of the parison has in effect created a puffing action within the parison which will protect the parison against any undesirable forming of webbing within the finished product. The final molding step of the operation is shown in FIGS. 6 and 10 which illustrate the shape of the article in its final form. Subsequently, the mold sections can be open and the stripper mechanism 20 (FIGS. 1 and 2) can be lowered to break the blown container away from the die head 10.

It is to be understood that the mold sections 24 and 26 are constructed in a conventional manner to have cooling water circuits or the like, therein through which a coolant can pass in order to maintain the mold sections at a desired temperature. By virtue of the invention described, the mold sections will remain open the minimum time required to extrude the parison 16, after which the molds can be closed and as an incident to closing of the molds, the lower end of the parison or tube is closed, and immediately thereafter, as the mold sections come together, the air which has been trapped within the parison, substantially at atmospheric pressure, will be compressed into a smaller volume by closing of the faces 38 upon the lower portion of the parison, thereby increasing the pressure of the air in the remaining parison so as to partially inflate the parison within the cavity 30. The parison can then be blown to its final form, and it will be recognized by those skilled in the art, that no lost time has occurred resulting from preshaping or in any other way of working on the parison prior to closing the mold sections which would operate to delay the closing of such sections.

It is claimed:

1. A method of making a hollow plastic article by preshaping and blowing a blank in an enclosing mold wherein the method is characterized by the low cycle time required to form the article free of surface impairments caused by condensation on the mold cavity surfaces, comprising the steps of cooling said mold to a selected temperature below ambient temperature, extruding a tube of plastic material open at its leading end to a length greater than the corresponding dimension of the hollow article to be blown, enclosing the tube in said mold at a rate of time such that significant condensation corresponding to said selected temperature has not yet formed in said mold, and as an incident to enclosing the tube in said mold and without increasing the mold closing time (a) closing the leading end of the tube to form a blank with air trapped therein substantially at atmospheric pressure and (b) collapsing a sufficient portion of the leading end of the closed blank to reduce the volume thereof so as to increase the internal air pressure to expand the blank partially substantially simultaneously with completion of the enclosing of the blank in the mold, injecting air into the partially expanded blank to inflate the blank to final form, and opening the mold to discharge the blown article at a minimum time period commensurate with the mold having been cooled to said selected temperature.

2. In a method of making a plastic article having an integral hollow handle by blowing a blank in an enclosing mold wherein the enclosing mold when in its closed position has a pair of abutting lands for defining the opening in the handle portion of the article and wherein the method is characterized by the low cycle time required to form the article free of surface impairments caused by condensation on the mold cavity surfaces, comprising the steps of cooling said mold to a selected temperature below ambient temperature, extruding a tube through an orifice to a length greater than the corresponding dimension of the article to be blown, initiating the closing of the mold about the extruded tube, closing the leading end of the extruded tube as an initial incident to closing of the mold to provide a closed blank containing air at approximately atmospheric pressure, immediately thereafter completing enclosing said blank in said mold and pinching together an intermediate portion of the blank at said lands and a sufficient portion of the leading end of the blank so as to transfer the air in the leading end to the remainder of the blank wherein the handle is to be formed to inflate said remainder partially substantially simultaneously with completion of closing of the mold to avoid formation of webs in said handle, said closing of the mold being at a rate of time such that significant condensation corresponding to said selected temperature has not yet formed in said mold, then injecting a gaseous medium into said blank to inflate the blank to final form, and opening the mold to discharge the blown article at a minimum time period commensurate with the mold having been cooled to said selected temperature.

3. In making a plastic container having a hollow handle free of internal webbing by blowing a blank in an enclosing mold which defines the container wherein the method is characterized by the low cycle time required to form the article free of surface impairments caused by condensation on the mold cavity surfaces, the steps of cooling said mold to a selected temperature below ambient temperature, extruding a tube through an orifice to a length greater than the corresponding dimension of container to be blown, initiating the closing of the mold about the extruded tube, closing the leading end of the extruded tube as an initial incident to closing the mold to provide a closed blank containing air approximately at atmospheric pressure, immediately thereafter completing enclosing said blank in said mold and pinching together a sufficient portion of the leading end of the blank so as to transfer the air therein to the remainder of the blank to create a puffing effect within said remainder simultaneously with closing of the mold so as to prevent formation of webbing in the handle of the blank which might otherwise be caused by the closing of the mold, said closing of the mold being at a rate of time such that significant condensation corresponding to said selected temperature has not yet formed in said mold, then injecting air into the enclosed blank to inflate the blank to final form, opening the mold to discharge the blow article at a minimum time period commensurate with the mold having been cooled to said selected temperature.

* * * * *